(12) United States Patent
Miller

(10) Patent No.: US 9,368,946 B2
(45) Date of Patent: *Jun. 14, 2016

(54) LINEAR ACTUATING EARTHING SWITCH

(71) Applicant: ROCKWELL AUTOMATION TECHNOLOGIES, INC., Mayfield Heights, OH (US)

(72) Inventor: David Miller, Kitchener (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 4 days.

This patent is subject to a terminal disclaimer.

(21) Appl. No.: 14/279,421

(22) Filed: May 16, 2014

(65) Prior Publication Data

US 2014/0246294 A1 Sep. 4, 2014

Related U.S. Application Data

(63) Continuation of application No. 13/526,897, filed on Jun. 19, 2012, now Pat. No. 8,748,760.

(51) Int. Cl.
*H01H 9/00* (2006.01)
*H02B 1/16* (2006.01)
*H01H 31/00* (2006.01)
*H01H 31/02* (2006.01)
*H01H 1/38* (2006.01)
*H01H 3/30* (2006.01)

(52) U.S. Cl.
CPC ............... *H02B 1/16* (2013.01); *H01H 1/385* (2013.01); *H01H 3/3052* (2013.01); *H01H 31/003* (2013.01); *H01H 31/026* (2013.01)

(58) Field of Classification Search
CPC ..... H01H 31/02; H01H 31/023; H01H 31/026; H01H 31/00; H01H 31/32
USPC ........ 200/255, 271, 290, 50.21, 50.24, 50.27; 361/608, 617, 636, 640
See application file for complete search history.

(56) References Cited

U.S. PATENT DOCUMENTS

| 7,297,890 | B2 | 11/2007 | Corti | |
|---|---|---|---|---|
| 8,748,760 | B2 * | 6/2014 | Miller | ........................ 200/50.21 |
| 2006/0006143 | A1 | 1/2006 | Corti | |

FOREIGN PATENT DOCUMENTS

| CN | 2916898 Y | 6/2007 |
|---|---|---|
| CN | 201498393 U | 6/2010 |
| DE | 102010020130 A1 | 11/2011 |
| EP | 1617447 A1 | 1/2006 |
| WO | 2009010359 A2 | 1/2009 |

OTHER PUBLICATIONS

European Search Report, Jan. 30, 2014; 5 pages.

(Continued)

*Primary Examiner* — Vanessa Girardi
(74) *Attorney, Agent, or Firm* — Quarles & Brady LLP

(57) ABSTRACT

A linear actuating earthing switch configuration that moves movable contacts using linear motion in a single axis. The earthing switch includes a frame with a rail on a slide wall. A sliding carriage slides on the rail in a linear direction, the sliding carriage including a plurality of movable contacts. A stored energy element provides a linear expansion force between the frame and the sliding carriage when the earthing switch is in an open position.

20 Claims, 6 Drawing Sheets

(56) References Cited

OTHER PUBLICATIONS

Rodrigo, H. "A 40 kV high-power earthing switch." Meas. Sci. Technol. 6 (1995): 1612-1616.

"Masterpact Earthing Switch." Technical Data Sheet. Schneider Electric Industries (2009): 1-4.
"MV and LV components—Evolis up to 24 kV" Catalogue. Schneider Electric Industries (2004): 1-18.
"EK6 Earthing Switch." Instruction Manual. ABB (2009): 1-20.

* cited by examiner

LINEAR ACTUATING EARTHING SWITCH

CROSS-REFERENCE TO RELATED APPLICATIONS

This application is a continuation application of pending U.S. patent application Ser. No. 13/526,897, filed Jun. 19, 2012, and entitled "LINEAR ACTUATING EARTHING SWITCH," which is hereby incorporated by reference.

STATEMENT REGARDING FEDERALLY SPONSORED RESEARCH OR DEVELOPMENT

Not applicable.

BACKGROUND OF THE INVENTION

The subject matter disclosed herein relates generally to switches, and, more particularly, to a linear actuating earthing switch.

In an electric power system, switchgear is generally referred to as the combination of electrical disconnect switches, fuses or circuit breakers used to control, protect and isolate electrical equipment. These components are used to de-energize equipment to allow work to be done, and to clear faults downstream. An earthing switch may be installed in conjunction with the switchgear, and is used to provide a level of protection for maintenance personnel working on the electrical power system against the risk of accidental connection of a parallel source or energization by reverse power. The protection is provided by "earthing" the part of the installation that is to be worked on by interconnecting and connecting to an earth potential the phase and neutral conductors of the electric power system.

Use of an earthing switch is particularly important during maintenance operations, but also during normal function of the switchgear assemblies. Prior to earthing the phase and neutral conductors or bus terminals, it is mandatory to disconnect the upstream source of electrical power supplying the switchgear.

Traditional earthing switches employ a rotary mechanism that requires considerable volumetric space in which to operate. The rotary mechanism includes a plurality of switch blades, or movable contacts, that during opening and closing, swing or rotate about a fulcrum having a rotational axis. Because the vast majority of this space is reserved to accommodate momentary occupation by switch blades and spring actuators as the switch opens and closes, it makes the utilization of this space for any other purpose impossible. To further punctuate the inefficiency of the rotary mechanism used in earthing switches, these types of switches are often used in very compact structures where usable space is at a premium.

There is a need, therefore, for an improved earthing switch that is able to operate with linear motion instead of rotary or rotational motion in order to reduce the amount of space required for an earthing switch.

BRIEF DESCRIPTION OF THE INVENTION

The present embodiments overcomes the aforementioned problems by providing an earthing switch configuration that moves movable contacts using linear motion in a single axis.

Accordingly, embodiments of the present invention include a linear actuating earthing switch. The switch comprises a frame, the frame including a top wall and side walls. A rail is mounted on at least one slide wall. A sliding carriage is slidable on the rail in a linear direction, the sliding carriage including a plurality of movable contacts. And, a stored energy element provides a linear expansion force between the top and the sliding carriage when the earthing switch is in an open position.

In accordance with another embodiment of the invention, a linear actuating switch. The switch comprises a frame, the frame including a top wall and side walls. A rail is provided on at least one slide wall. A sliding carriage is slidable on the rail in a linear direction, the sliding carriage including a plurality of movable contacts. And, a stored energy element provides a linear expansion force between the top wall and the sliding carriage when the sliding carriage is moving from an open position to a closed position and the closed position to the open position.

In accordance with another embodiment of the invention, a linear actuating switch comprises a C shaped frame, the frame including a top wall, side walls, and an open bottom. A rail on at least one slide wall. A shaft coupled to the top wall and extending in a linear direction toward the open bottom. A sliding carriage slidable on the rail in the linear direction, the sliding carriage including an aperture to allow the shaft to extend through the aperture, the sliding carriage including a plurality of movable contacts. And, a stored energy element provides a linear expansion force between the top wall and the sliding carriage such that the stored energy element provides the linear expansion force in the same linear direction the sliding carriage slides on the rail.

To the accomplishment of the foregoing and related ends, the embodiments, then, comprise the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

BRIEF DESCRIPTION OF THE DRAWINGS

The embodiments will hereafter be described with reference to the accompanying drawings, wherein like reference numerals denote like elements, and.

DETAILED DESCRIPTION OF THE INVENTION

Figure 1:
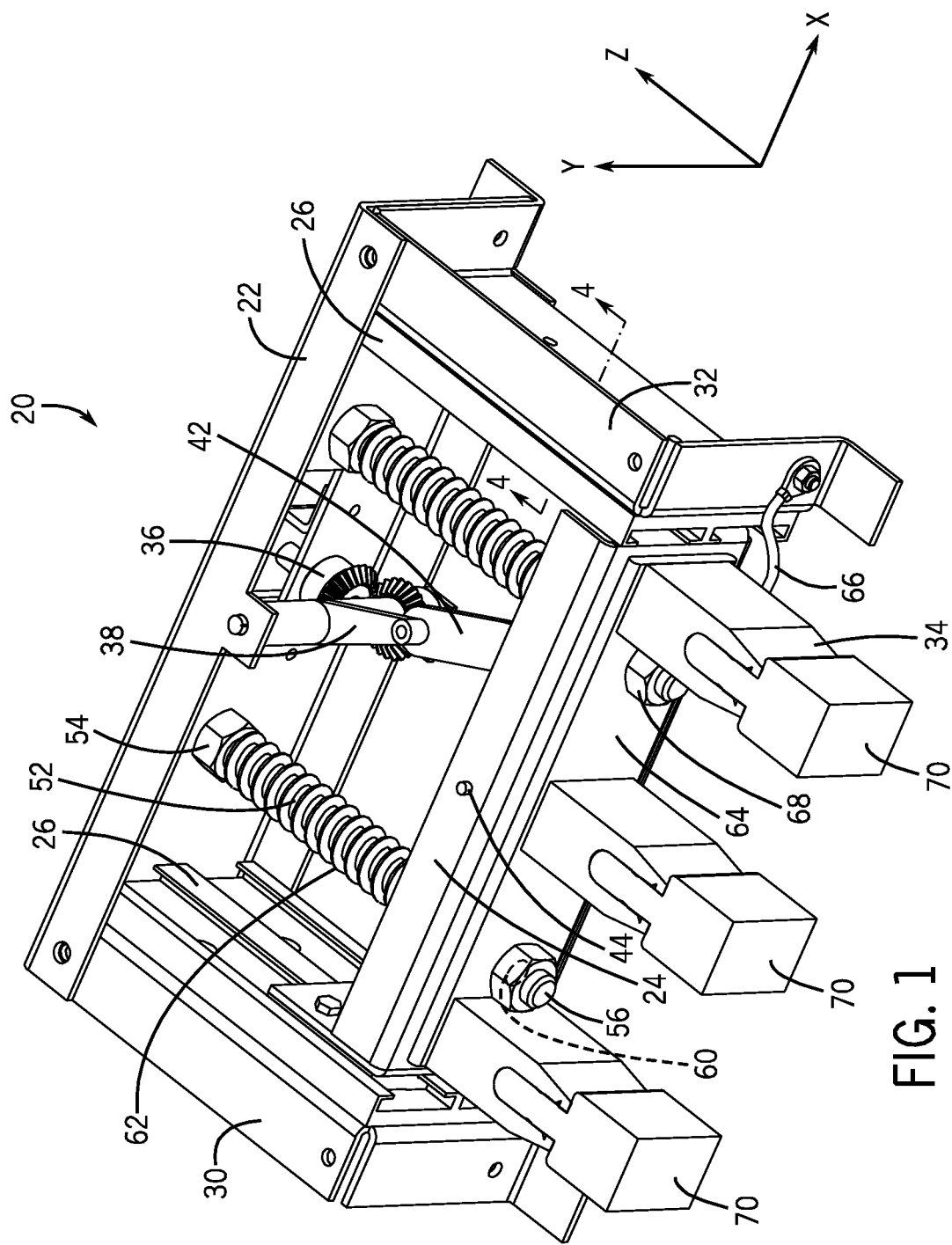
FIG. 1 is a perspective front view of a linear actuating switch in a closed position, according to embodiments of the present invention.
Figure 2:
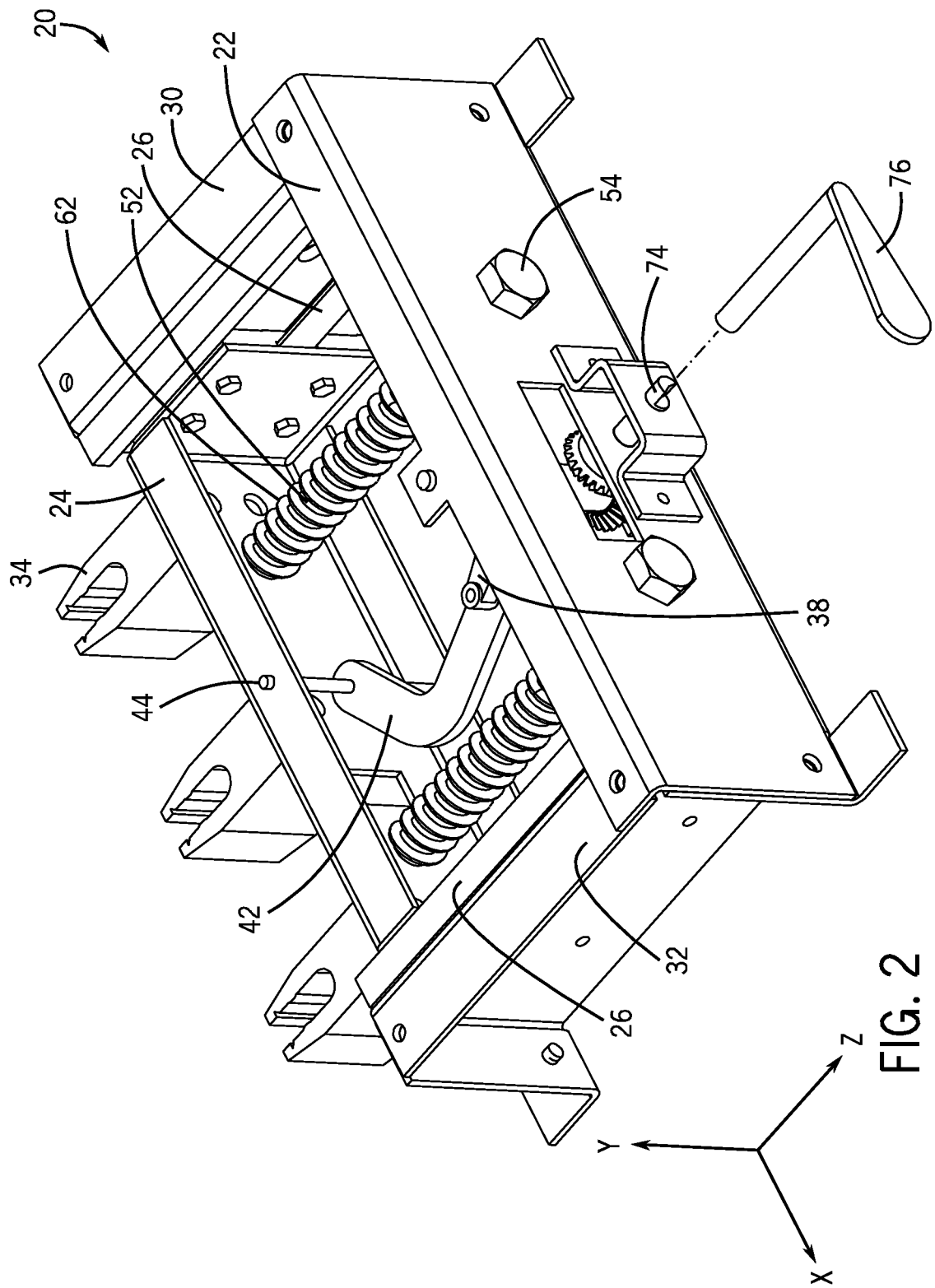
FIG. 2 is a perspective top view of the linear actuating switch of FIG. 1 in the closed position.
Figure 3:
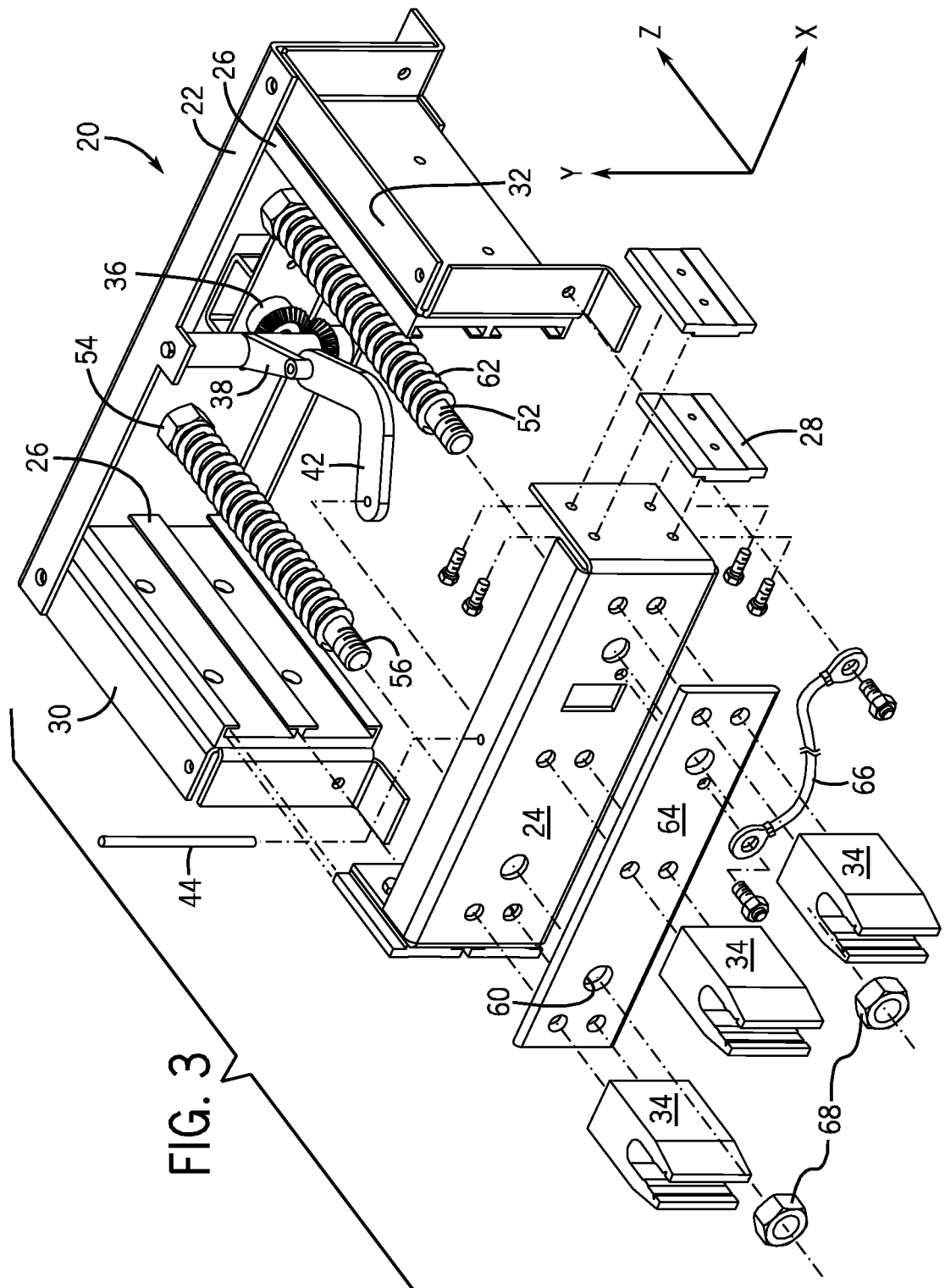
FIG. 3 is an exploded view of the linear actuating switch of FIG. 1.
Figure 4:
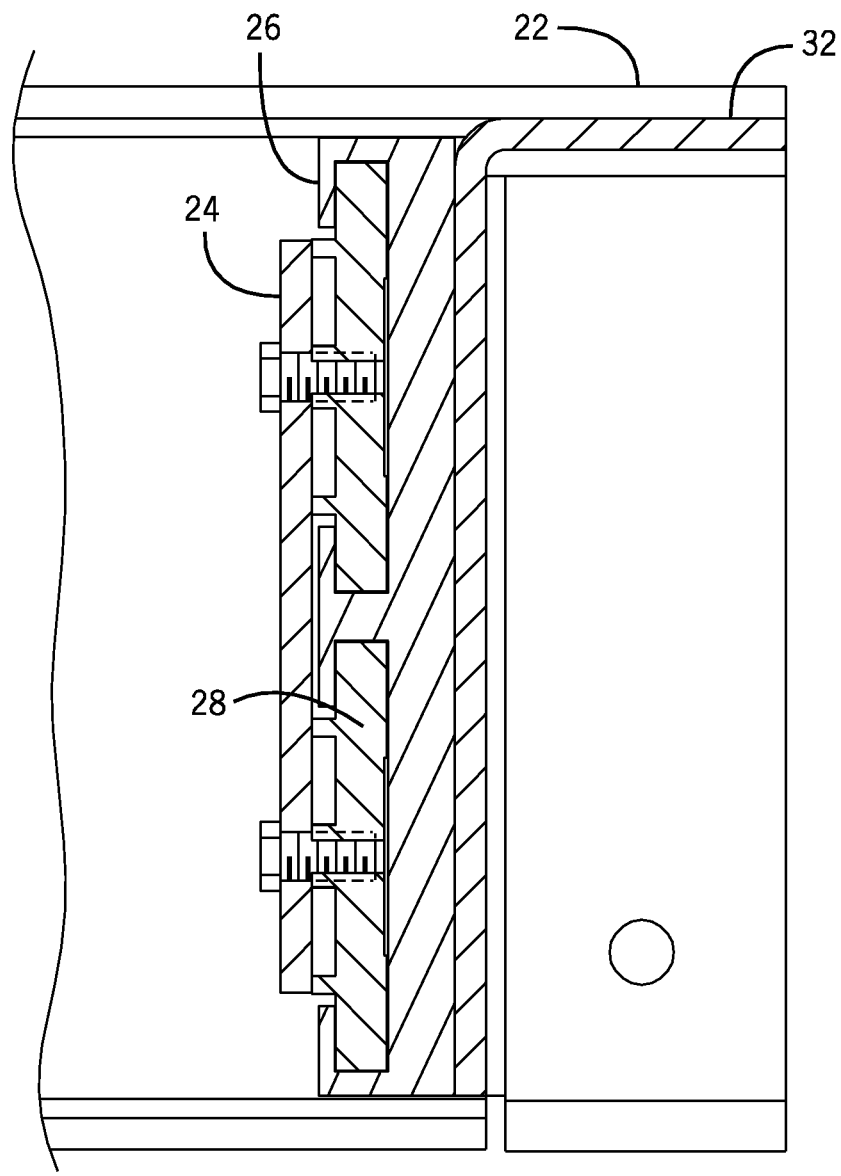
FIG. 4 is a sectional view of the slide and rail allowing linear movement of the sliding carriage.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein.

The detailed description is to be read with reference to the figures. The figures depict selected embodiments and are not intended to limit the scope of embodiments of the invention. Skilled artisans will recognize the examples provided herein have many useful alternatives and fall within the scope of embodiments of the invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings. As used herein, unless expressly stated otherwise, "connected" means that one element/feature is directly or indirectly connected to another element/feature, and not necessarily electrically or mechanically. Likewise, unless expressly stated otherwise, "coupled" means that one element/feature is directly or indirectly coupled to another element/feature, and not necessarily electrically or mechanically.

The various embodiments of the invention will be described in connection with a linear actuating switch. The linear actuating switch will be described in terms of an earthing switch used for earthing parts of an electric circuit. That is because the features and advantages of the invention are well suited for this purpose. Still, it should be appreciated that the various aspects of the invention can be applied in other forms and in other switches capable of utilizing a linear actuation configuration. As used herein, earthing not only means connection to earth ground but also can include circuit common or chassis common connections where a floating ground or other grounding situation may exist.

As discussed in detail below, embodiments of the present invention function to provide a linear actuating switch. As used herein, as its name implies, a linear actuating switch employs a configuration that moves a plurality of contacts in a linear path, as opposed to a rotary or angular path. Because most or all of the elements may be linearly arranged, they can occupy a more rectangular shaped volume rather than the more traditional roughly cubic shaped volume for traditional rotary earthing switches. Because the components of the linear actuating switch provide for movable contact motion in the same linear direction, they can easily be nested together to further minimize space requirements.

Earthing switches are required by code to provide through air clearance between the moving contacts and the fixed contacts. All earthing switches also have static components that must include sufficient through air clearance to provide necessary isolation. Because linear contacts operate in the volume usually reserved to provide clearance for traditional rotary operating movable contacts, they have the potential, dependent on the nesting of other elements, to be even more space efficient. In essence, the entire operating space requirement of a linear operating earthing switch according to embodiments described herein have the potential to be equal to or less than the volume of a traditional rotary operated earthing switch in the closed or "earthed" condition. This may effectively recover the volume allocated for the rotary contacts and/or rotary priming mechanisms to travel and remain in the open or "unearthed" condition for use for other purposes.

Referring initially to FIGS. 1-4, an exemplary linear actuating earthing switch 20 generally includes a switch frame 22, a sliding carriage 24 with slides 28 that move along a rail 26 mounted on either or both inside walls 30, 32 of the frame 22, and a plurality of movable contacts 34 mounted on the sliding carriage 24. The earthing switch 20 provides a stand-alone switch configuration that can be utilized within a switchgear configuration. The movable contacts 34 may be replaceable with a variety of alternate contacts known to those skilled in the art.

The controlled motion of the sliding carriage 24 may be provided by a gear mechanism 36, such as a bevel gear or miter gear, for example. The gear 36 latches in the open or "unearthed" position by means of a known mechanical over center arrangement 38. The over center arrangement holds the gear mechanism 36 at one end of the mechanism travel (see FIG. 5). In some embodiments, two over center arrangements may be used to hold the gear mechanism 36 in either end of the mechanism travel.

The over center arrangement 38 couples to an actuating arm 42, which couples to the sliding carriage 24 by way of a coupling pin 44. Rotation of the gear mechanism 36 causes the over center arrangement 38 and the actuating arm 42 to move in the same linear Z plane as the sliding carriage 24.

Figure 5:
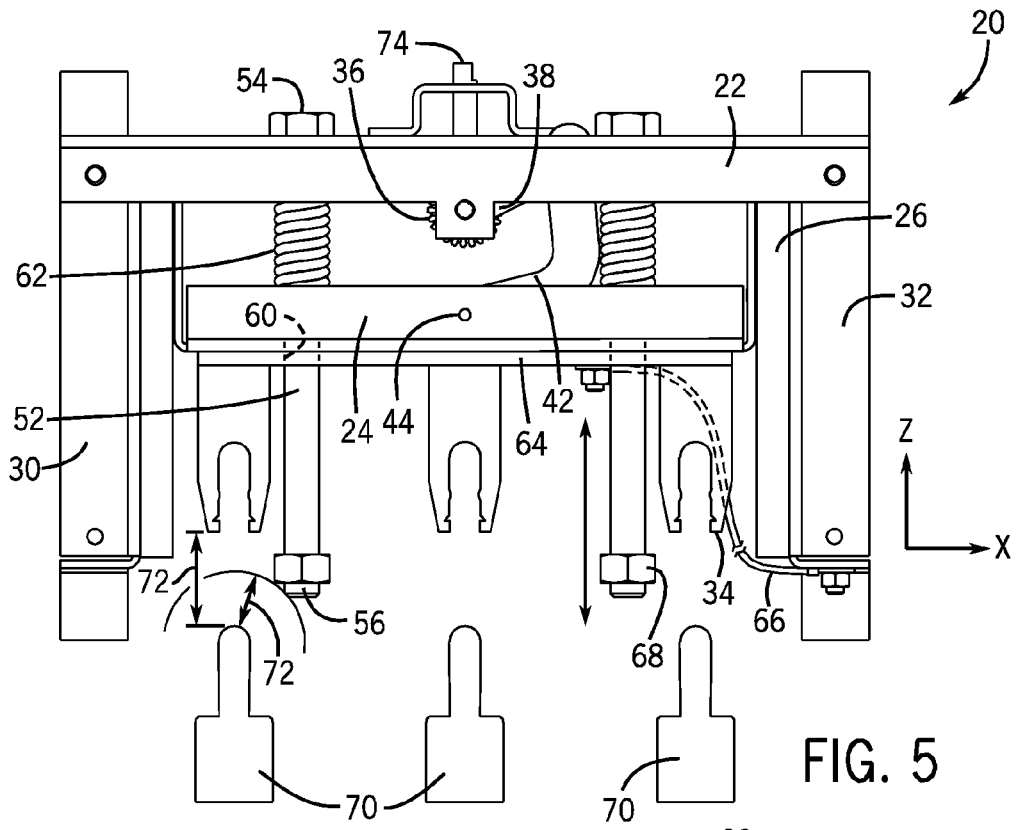
FIG. 5 is a front view of the linear actuating switch of FIG. 1 in the open position.
Figure 6:
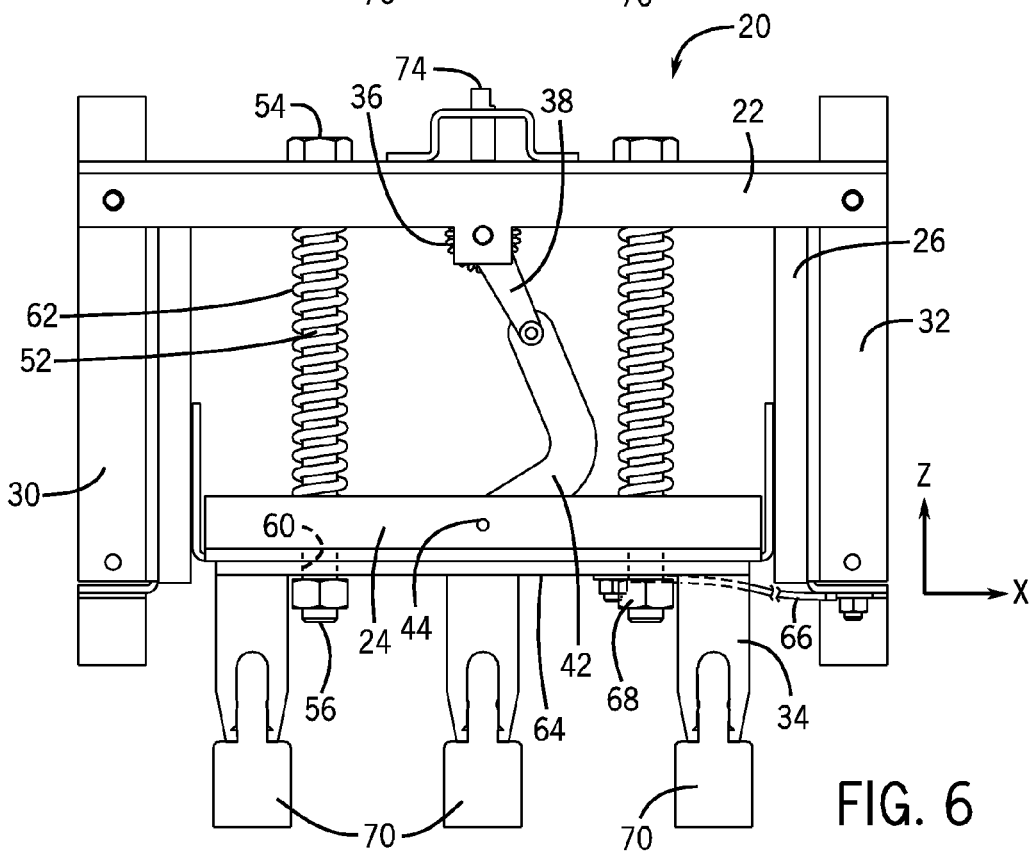
FIG. 6 is a front view of the linear actuating switch of FIG. 5 in the closed position.

Referring to FIGS. 5 and 6, a plurality of actuating shafts 52 are shown coupled to the switch frame 22 at a proximal end 54. Structurally, a single actuating shaft may be used, but more than one actuating shaft would likely provide improved structural soundness. The distal portion 56 of the actuating shaft 52 slides through an aperture 60 in the sliding carriage 24. An axially mounted coil spring 62 surrounds the actuating shaft 52, and provides the energy to close or "earth" the earthing switch 20.

The combination of the gear mechanism 36 and the coil springs 62 allow the earthing switch 20 to be mechanically primed. In addition, the closing action is provided using stored mechanical energy instead of gravity actuated. The use of stored mechanical energy allows the earthing switch 20 to operate in any specific orientation. Furthermore, the mechanical over center arrangement 38 combined with the coil springs 62 may be used to provide a mechanical latching in both an open and closed configuration, so a loss of power would not result in an uncontrolled opening or closing of the earthing switch 20.

The coil springs 62 located on the actuating shafts 52 are linearly positioned between the switch frame 22 and the sliding carriage 24, and are used to transmit the linear force during the switch closing process. Thus, the energy required to close the earthing switch 20 is provided by energy stored mechanically in the coil springs. A stop 68 may provide a maximum allowable linear travel for the sliding carriage 24 and associated moveable contacts 34. In some embodiments, the stop 68 may comprise a nut on the actuating shaft 52. In the switch opening process, in contrast, the coil springs 62 have no effect on the speed of contact separation.

Earthing switches typically include three moveable contacts. As shown, the earthing switch 20 includes three movable contacts 34 located on the sliding carriage 24. The movable contacts 34 are electrically connected and ganged to each other by a short-circuiting bridge 64, such that the ganged contacts operate as part of the cohesive sliding carriage unit 24. The movable contacts 34 are electrically connected to an earth potential through the short-circuiting bridge 64 using an earthing conductor 66, such as a braided or stranded copper conductor. In some embodiments, more than one earthing conductor may be used. The earthing conductor may be tin plated, and may include a crimp on one or both ends.

In some embodiments, the earthing switch 20 may include a plurality of fixed contacts 70. The fixed contacts may be electrically coupled to the phase and neutral conductors, respectively, of the electrical system incorporating the earthing switch 20. When the earthing switch is in an open configuration (FIG. 5), a minimum air gap 72 is required between the fixed contacts 70 and the earthing switch 20 (e.g., the distal portion 56 of the actuating shaft 52), and between the movable contacts 34 and the fixed contacts 70. Because of the linear movement of the movable contacts 34, the open air gap 72 of the linear actuating earthing switch 20 is the same required clearance in both the open configuration, and for travel of the movable contacts 34. In comparison, a rotary actuated switch includes a clearance for stationary components of the rotary switch, and an additional clearance for the rotating movable contacts. This added clearance increases the overall size of the space required for the rotary switch.

Figure 7:
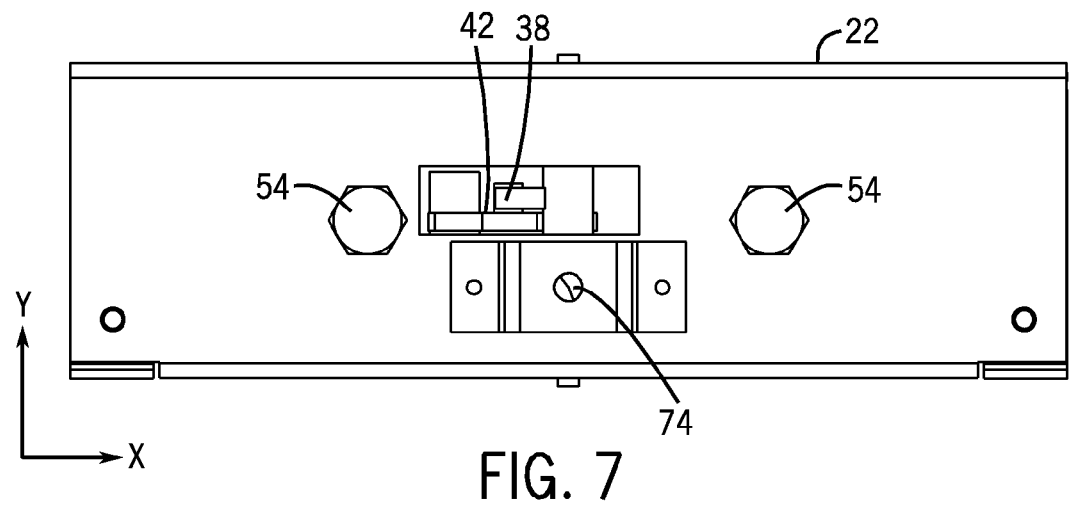
FIG. 7 is a top view of the linear actuating switch of FIG. 1.
Figure 8:
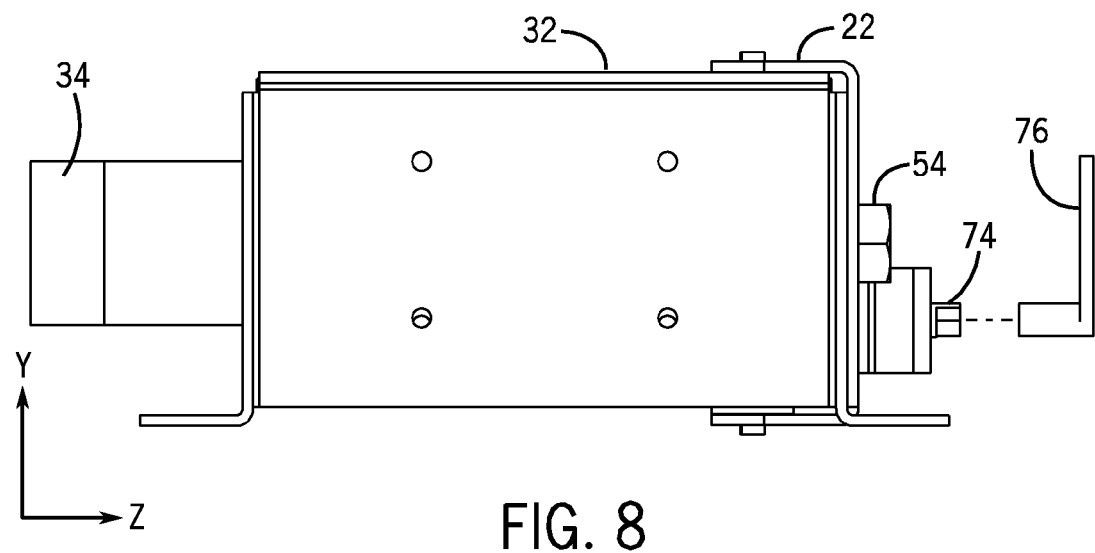
FIG. 8 is a side view of the linear actuating switch of FIG. 1, according to embodiments of the present invention.

Referring to FIGS. 7 and 8, the earthing switch 20 may be actuated by a mechanical input 74 coupled to the gear mechanism 36 for both closing and opening. The mechanical input allows a manual input from the operator in order to operate the gear mechanism 36. The operator may use a crank handle 76 to couple to the mechanical input 74 to open and close the switch 20. The mechanical input allows the earthing switch 20 to serve as a dual action switch that can be "earthed" and "unearthed" at will. As such, the earthing switch 20 may rely solely on manual input from the operator, although a motorized or other form of operating mechanism may be used.

Some embodiments may include a snap-action operating mechanism for positive closing. The earthing switch 20 may also be fitted with an auxiliary switch for annunciation purposes.

An earthing switch includes both electrical and mechanical properties. According to the International Electrotechnical Commission (IEC) standards, an earthing switch must be capable of multiple close operations and multiple mechanical operations. In order to be IEC certified and/or rated, an earthing switch may need to meet certain standards, such as IEC 62271-1, IEC 62271-102, IEC 62271-200 and IEC 60265-1. For example, in order to receive a Class E3 rating, an earthing switch would need to go through a test sequence that requires the switch to go through five operations, where the five operations are done in a sequence of 2C-x-2C-y-1C, where x and y are arbitrary switching tests, or no load tests. To further elaborate, the 2C and 1C represent two close and one close. Similarly, in order to receive a Class M1 rating, an earthing switch would need to go through a test sequence that requires the switch to perform two thousand mechanical operations.

Finally, due to the sliding carriage and the fact that it travels in a linear fashion, a variety of contact configurations other than the traditional "blade" arrangement may be utilized. This offers the potential to use existing or commercial available contacts to customize the earthing switch to a specific environment, duty cycle, and current rating, for example.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Finally, it is expressly contemplated that any of the processes or steps described herein may be combined, eliminated, or reordered. Accordingly, this description is meant to be taken only by way of example, and not to otherwise limit the scope of this invention.

We claim:

1. A linear actuating earthing switch comprising:
   a frame, the frame including a top wall and side walls;
   a rail on at least one side wall;
   a sliding carriage slidable on the rail in a linear direction, the sliding carriage including a plurality of movable contacts; and
   a stored energy element providing a linear expansion force between the top wall and the sliding carriage when the earthing switch is in an open position.

2. The earthing switch according to claim 1, wherein the stored energy element is in a perpendicular orientation to both the top wall and the sliding carriage.

3. The earthing switch according to claim 1, wherein a stop provides a maximum linear travel for the sliding carriage.

4. The earthing switch according to claim 1, wherein the stored energy element is positioned between the top wall and the sliding carriage when the sliding carriage is moving from the open position to a closed position and the closed position to the open position.

5. The earthing switch according to claim 1, further including a linear shaft coupled to the top wall and extending through an aperture in the sliding carriage, wherein the sliding carriage slides in the linear direction along the linear shaft.

6. The earthing switch according to claim 5, wherein the sliding carriage slides over the linear shaft when the sliding carriage is moving from an open position to a closed position and the closed position to the open position.

7. The earthing switch according to claim 1, further including a plurality of fixed contacts, the moving contacts operable to electrically couple to the fixed contacts.

8. The earthing switch according to claim 7, wherein an air gap is provided between the plurality of fixed contacts and the plurality of moving contacts when the earthing switch is in the open position.

9. The earthing switch according to claim 1, further including a latching mechanism coupled to the top wall and the sliding carriage.

10. The earthing switch according to claim 9, further including a mechanical input coupled to the latching mechanism.

11. The earthing switch according to claim 9, wherein the latching mechanism latches in the open position.

12. The earthing switch according to claim 9,
wherein the latching mechanism is in mechanical communication with an actuating arm.

13. The earthing switch according to claim 12,
wherein the actuating arm moves in the same linear plane as the sliding carriage.

14. A linear actuating earthing switch comprising:
a frame, the frame including a top wall and side walls;
a rail on at least one side wall;
a sliding carriage slidable on the rail in a linear direction, the sliding carriage including a plurality of movable contacts; and
a stored energy element providing a linear expansion force between the top wall and the sliding carriage when the sliding carriage is moving from an open position to a closed position and the closed position to the open position.

15. The earthing switch according to claim 14,
wherein the stored energy element provides the linear expansion force in the same linear direction the sliding carriage slides on the rail.

16. The earthing switch according to claim 14,
wherein the sliding carriage includes a slide, the slide to interface with the rail so as to allow the sliding carriage to travel in the linear direction.

17. The earthing switch according to claim 14,
wherein the moveable contacts are removable and replaceable.

18. The earthing switch according to claim 14,
further including a linear shaft coupled to the top wall and extending through an aperture in the sliding carriage such that the sliding carriage slides in a linear direction along the linear shaft.

19. A linear actuating earthing switch comprising:
a C shaped frame, the frame including a top wall, side walls, and an open bottom;
a rail on at least one side wall;
a shaft coupled to the top wall and extending in a linear direction toward the open bottom;
a sliding carriage slidable on the rail in the linear direction, the sliding carriage including an aperture to allow the shaft to extend through the aperture, the sliding carriage including a plurality of movable contacts; and
a stored energy element providing a linear expansion force between the top wall and the sliding carriage such that the stored energy element provides the linear expansion force in the same linear direction the sliding carriage slides on the rail.

20. The earthing switch according to claim 19,
wherein the stored energy element is a spring.

\* \* \* \* \*